(12) United States Patent
Wu et al.

(10) Patent No.: US 7,719,771 B2
(45) Date of Patent: May 18, 2010

(54) DEFORMABLE OPTICAL ELEMENT, METHODS OF MAKING AND USES THEREOF

(75) Inventors: Wei Wu, Mountain View, CA (US); Shih-Yuan Wang, Palo Alto, CA (US); Alexandre M. Bratkovski, Mountain View, CA (US); Theodore I. Kamins, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 27 days.

(21) Appl. No.: 11/881,182

(22) Filed: Jul. 25, 2007

(65) Prior Publication Data

US 2009/0027778 A1    Jan. 29, 2009

(51) Int. Cl.
G02B 3/00  (2006.01)
(52) U.S. Cl. .................. 359/642; 359/738
(58) Field of Classification Search ............ 359/642, 359/738, 665–667; 351/159–177
See application file for complete search history.

(56) References Cited

U.S. PATENT DOCUMENTS

| | | | |
|---|---|---|---|
| 5,986,795 A | 11/1999 | Chapman et al. | |
| 6,433,917 B1 | 8/2002 | Mei et al. | |
| 6,747,806 B2 | 6/2004 | Gelbart | |
| 6,952,313 B2 | 10/2005 | Schrader | |
| 7,042,485 B2 | 5/2006 | Hall | |
| 7,173,764 B2 | 2/2007 | Carr et al. | |
| 7,209,280 B2 | 4/2007 | Goossens | |
| 7,261,736 B1* | 8/2007 | Azar | 623/6.22 |
| 2002/0118464 A1* | 8/2002 | Nishioka et al. | 359/642 |
| 2005/0023573 A1 | 2/2005 | Govil et al. | |
| 2006/0232846 A1 | 10/2006 | Himmer et al. | |
| 2006/0262434 A1 | 11/2006 | Ealey et al. | |
| 2008/0144186 A1* | 6/2008 | Feng et al. | 359/666 |
| 2008/0239925 A1* | 10/2008 | Kuiper et al. | 369/112.02 |

* cited by examiner

Primary Examiner—Darryl J Collins

(57) ABSTRACT

A deformable optical element includes an elastically deformable lens. Electrical contacts are directly attached to the elastically deformable lens and configured to receive an applied voltage. The electrical contacts have opposing surfaces configured to develop electrostatic forces in response to the applied voltage. The electrostatic forces deform the elastically deformable lens to create a predetermined optical effect.

23 Claims, 5 Drawing Sheets

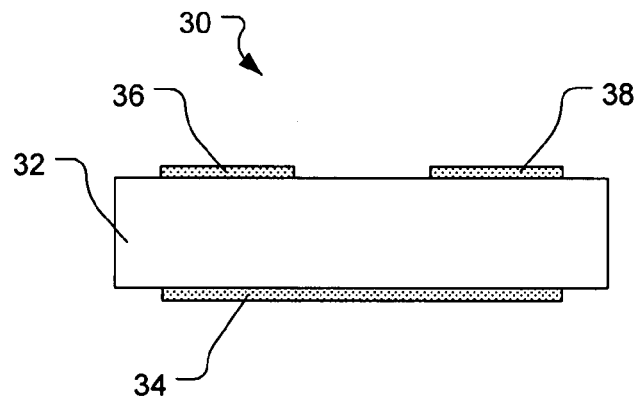
FIG. 4
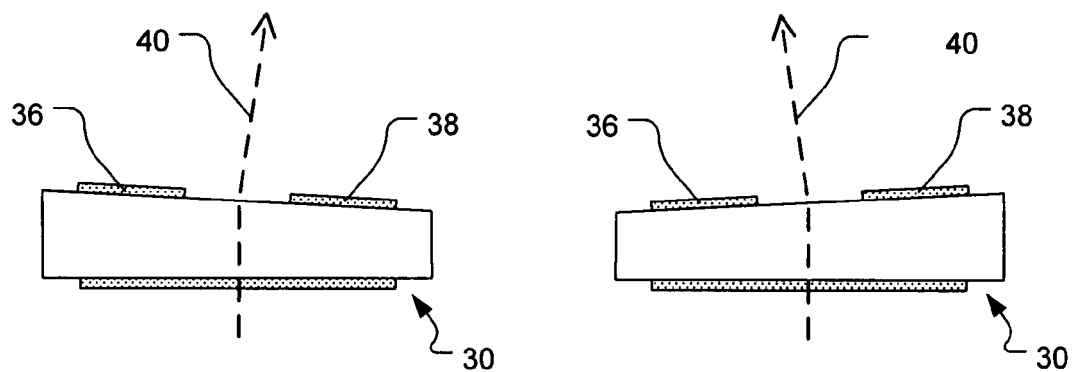
FIG. 5  FIG. 6

DEFORMABLE OPTICAL ELEMENT, METHODS OF MAKING AND USES THEREOF

BACKGROUND

Optical communications technology is finding increasing use in a variety of applications. For example, optical communications links are being considered for replacement of wire interconnections between integrated circuits on a circuit board, and between circuit boards within electronic systems.

One component in most optical communication links is a lens. For example, lenses are used to focus received light on a detector, collimate transmitted light into a beam, or to change the direction of a beam. One challenge in optical systems is when the focus of a lens or angle is to be changed. Lens with fixed optical properties in an optical system can be physically moved relative to each other to provide desired changes in focal length, for example, as in a zoom lens. Mechanical steering of beams using mirrors is known. Such systems can however be mechanically complex and difficult to integrate into an electronic system.

For example, in providing optical interconnection within an electronic system, tolerances in the card cage holding the circuit boards can result in varying positions of the circuit boards relative to each other. In addition to static changes in relative position present during initial placement of cards into the card cage, dynamic variations in relative position can be introduced during operation due to heating, vibration, and other environmental effects. These changes in relative position can result in loss of alignment and focus in an optical interconnect system. Providing mechanically adjustable lenses to compensate for these variations can be complex, expensive, and unreliable.

BRIEF DESCRIPTION OF THE DRAWINGS

Features and advantages of the invention will be apparent from the detailed description which follows, taken in conjunction with the accompanying drawings which together illustrate, by way of example, features of the invention; and, wherein:

FIG. 4 is a side view illustration of a deformable optical element in accordance with another embodiment of the present invention;

FIG. 5 is a side view illustration of the deformable optical element of FIG. 4 showing a distorted shape providing beam steering in a first direction;

FIG. 6 is a side view illustration of the deformable optical element of FIG. 4 showing a distorted shape providing beam steering in a second direction;

DETAILED DESCRIPTION OF EXAMPLE EMBODIMENTS

In describing embodiments of the present invention, the following terminology will be used.

The singular forms "a," "an," and "the" include plural referents unless the context clearly dictates otherwise. Thus, for example, reference to "a component surface" includes reference to one or more of such surfaces.

As used herein, the term "about" means that dimensions, sizes, formulations, parameters, shapes and other quantities and characteristics are not and need not be exact, but may be approximated and/or larger or smaller, as desired, reflecting tolerances, conversion factors, rounding off, measurement error and the like and other factors known to those of skill in the art.

Reference will now be made to the exemplary embodiments illustrated, and specific language will be used herein to describe the same. It will nevertheless be understood that no limitation of the scope of the invention is thereby intended.

Figure 1:
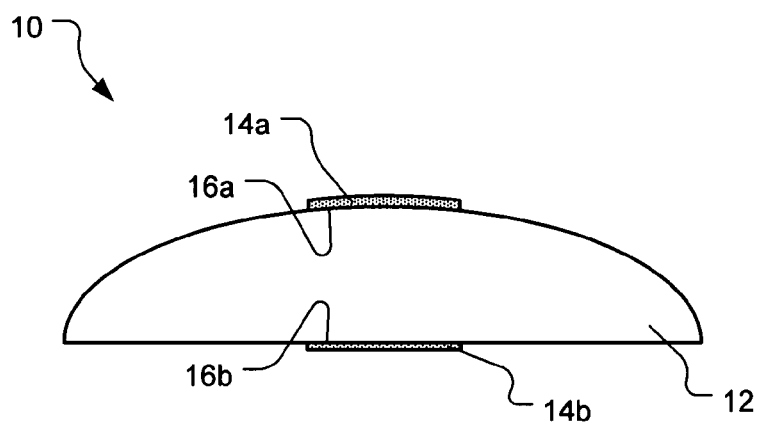
FIG. 1 is a side view illustration of a deformable optical element in accordance with an embodiment of the present invention.

A deformable optical element has been developed as illustrated in FIG. 1 in accordance with an embodiment of the present invention. The optical element, shown generally at 10, includes an elastically deformable lens 12. A plurality of electrical contacts 14a, 14b are directly attached to the deformable lens and configured to receive an applied voltage. Contacts may be attached to the surface of the elastically deformable lens or disposed within the elastically deformable lens. Various arrangements of the electrical contacts can be used as described further below.

The plurality of electrical contacts 14a, 14b have opposing surfaces 16a, 16b that are configured to develop electrostatic force in response to the applied voltage. The electrostatic force between the opposing surfaces in turn deforms the elastically deformable lens to create a predetermined optical effect. The electrical contacts are attached to the lens at positions designed to produce the predetermined optical effect.

For example, the electrostatic force may be attractive (e.g., by forcing opposite sign charge onto the surfaces 16a, 16b) or repulsive (e.g., by forcing same sign charge onto the surfaces). The predetermined optical effect may be, for example, a change in focal length of the elastically deformable lens 12.

Figure 2:
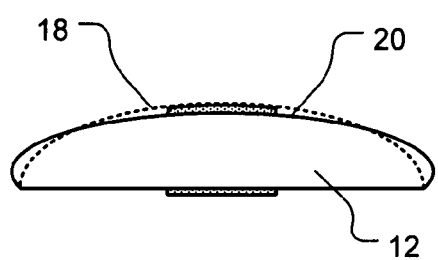
FIG. 2 is a side view illustration of the deformable optical element of FIG. 1 showing a change in focal length obtained by changing from an original shape to a first distorted shape.
Figure 3:
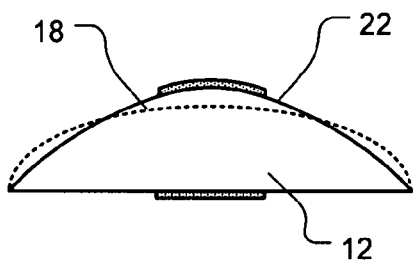
FIG. 3 is a side view illustration of the deformable optical element of FIG. 1 showing a change in focal length obtained by changing from an original shape to a second distorted shape.

As a particular example, as illustrated in FIG. 2, by introducing attractive electrostatic forces between the electrical contacts, the lens 12 may be distorted to increase focal length by changing the shape from a relaxed, original shape 18 to a first distorted shape 20 that decreases the radius of curvature of at least a portion 24 of the lens. As another example, as shown in FIG. 3 the lens may be distorted to decrease focal length by changing the shape to a second distorted shape 22 that increases the radius of curvature. Varying the focal length of the lens can be used, for example, to focus or collimate an optical beam passing through the lens.

As another example, one or more of the electrical contacts can be in a ring configuration, where the open interior or the ring is centered on the optical axis of the lens. Such a configuration can be advantageous in that the electrical contact avoids the optical center of the lens, helping to reduce distortion or aberration that may be caused by the electrical contact and also allows light to pass unobstructed along the optical axis of the system so that opaque electrical contacts can be used.

It will be appreciated that the illustrations of FIG. 2 and FIG. 3 are not to scale and exaggerate the deflection of the elastically deformable lens 12. For example, focal lengths may be on the order of a few millimeters to a few centimeters, and variation of focal length may be a few percent or less. Beam steering may be relatively small, providing beam deflection of a millimeter or less over a distance of a few centimeters, or in other words angles of less than about 5 degrees. Dimensions of the elastically deformable lens may be in the range of millimeters to tens of micrometers. Accordingly, deflections of elastically deformable lens may be tens of micrometers or less while providing useful amounts of focus and beam steering control.

Many alternative geometries for a deformable lens and positioning of the electrical contacts can be used in accordance with embodiments of the present invention. For example, FIG. 4 illustrates an alternate arrangement of a deformable optical element in accordance with an embodiment of the present invention. The deformable optical element, shown generally at 30, includes an elastically deformable lens 32, and a base contact 34 disposed on a first side of the elastically deformable lens. A first steering contact 36 and a second steering contact 38 are disposed on a second side of the elastically deformable lens. Additional steering contacts can be included, if desired, as described further below.

The lens can also be distorted to control the deflection of a beam passing through the lens. For example, a lens where the entry surface and the exit surface are non-parallel results in bending of the optical path through the lens. This property can be used to steer a beam passing through the lens. Accordingly, a beam deflection angle of the lens 32 can be varied by applying differing voltages to the steering contacts 36, 38 relative to the base contact 34. By varying the beam deflection angle of the lens, steering of a beam passing through the lens can be performed. For example, by applying voltage to cause repulsion between the first steering contact and the base contact (or applying voltage to cause attraction between the second steering contact and the base contact, or applying appropriate voltages to all of the contacts), the deformable lens (or portions of the deformable lens) can be formed into a wedge-like shape which will bend a light beam 40 as shown in FIG. 5. Swapping the voltages applied to the steering contacts changes the direction of the beam deflection, bending the light beam in the other direction as shown in FIG. 6. Depending on the amount of voltage applied, the amount of beam deflection angle can be varied, varying the amount of bending of the beam.

Figure 11:
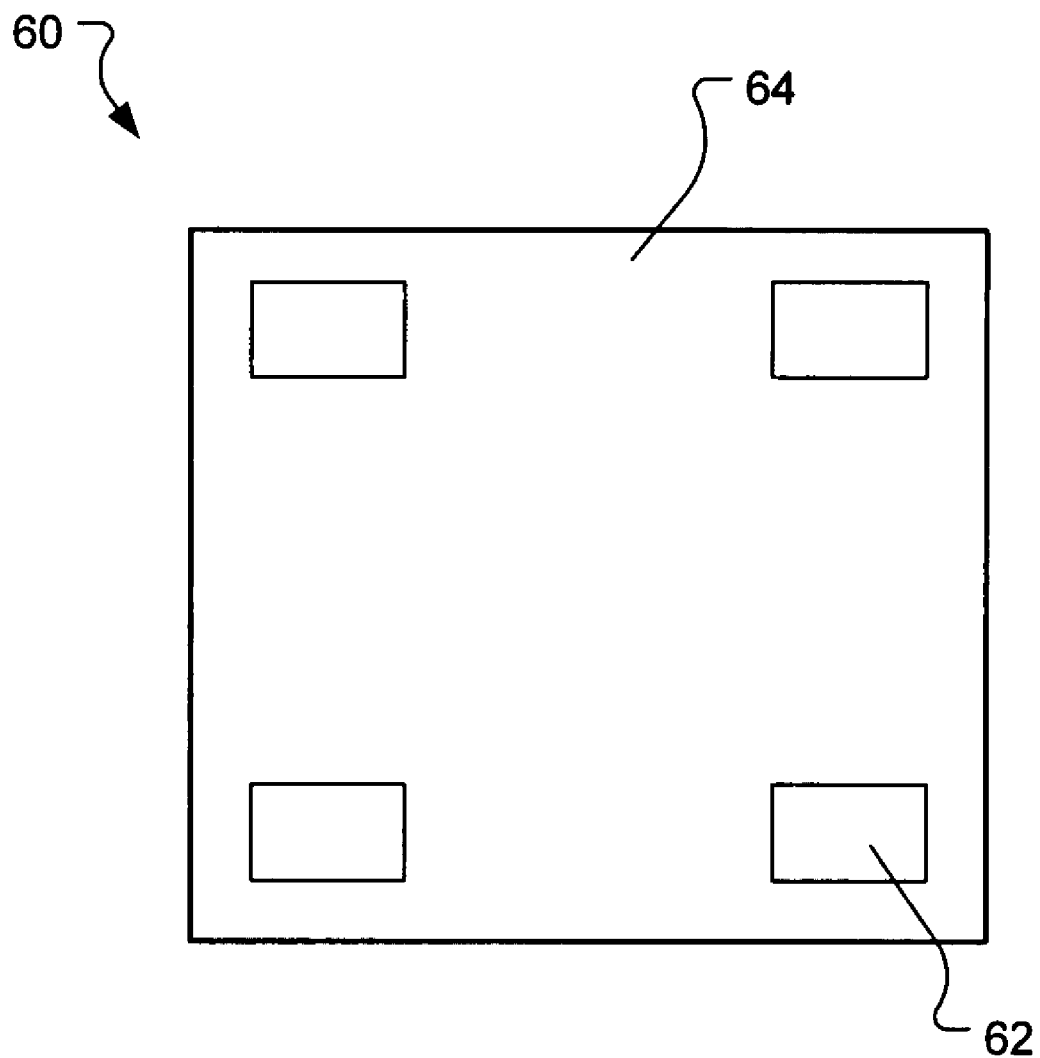
FIG. 11 is a top view illustration of a deformable optical element in accordance with another embodiment of the present invention.

While the deformable optical element 30 of FIG. 4 provides beam deflection in one direction, a deformable optical element 60 is shown in top view in FIG. 11 which provides beam deflection in two orthogonal directions using four steering contacts 62 attached to an elastically deformable lens 64. It will be appreciated that larger number of contacts can be used to provide greater control over the shape of the elastically deformable lens.

Depending on the materials from which the lens is constructed and the number and positioning of the electrical contacts, the amount of curvature that is produced in the lens surfaces can be varied. Combinations of materials may also be used (for example, an elastically deformable lens can be formed of a flexible outer casing and a fluid interior which will provide different properties than an elastically deformable lens formed from a solid material).

Figure 7:
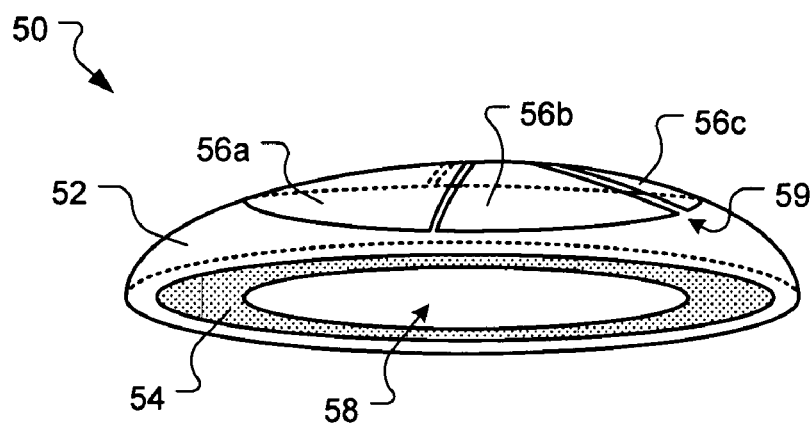
FIG. 7 is a perspective view illustration of a deformable optical element in accordance with yet another embodiment of the present invention.

FIG. 7 illustrates another embodiment of a deformable optical element that provides both variable focal length and beam steering. The deformable optical element 50 includes an elastically deformable lens 52. A base contact 54 and a plurality of steering contacts 56a, 56b, 56c are directly attached to the elastically deformable lens. The steering contacts may be disposed substantially concentrically about an optical center of the lens, although other arrangement may also be used. Voltages can be applied to the steering contacts referenced to the base contact. Common-mode voltage applied to the steering contacts provides primarily changes in the focal length of the lens. Differential-mode voltage applied to the steering contacts provides primarily changes in the beam deflection angle of the lens. It will be appreciated that for focal length changing only, a single contact on a front surface of the lens and a second contact on a rear surface of the lens may be used.

One benefit of attaching electrical contacts directly to an elastically deformable lens is that electrostatic forces developed between the contacts translate directly into forces applied to the lens without passing through intermediate support or other structures. Accordingly, predetermined optical shapes of the lens can be engineered based on the elasticity of the material used for the lens, the geometry of the lens, and the geometry of the electrical contacts. Design of the lens can thus be somewhat decoupled from the structure into which the lens will be mounted or attached. Accordingly, complex engineering of the structure into which the lens is mounted may be avoided.

In general, larger electrical contact surfaces allow for increased electrostatic forces to be developed to deform the lens. Accordingly, a large electrical contact may cover portions of the lens through which it is desired to pass through an optical beam. Accordingly, the electrical contacts can be formed of a transparent conductor. For example, indium-tin-oxide is one exemplary material which can be used for forming the electrical contacts. Because deformation of the elastically deformable lens is driven by electrostatic forces, relatively small current flows within the electrical contacts (driven by the capacitive loading of the electrical contacts) and thus high conductivity materials are not required. Actual current flow in the contacts will depend on the size of the contacts, relative size and distance between contacts, rate of variation of voltage, etc. Accordingly, other transparent conductors, including for example transparent conductive oxides, doped polymers, carbon nanotubes suspended within a polymer binder, and the like, can be used.

As another example, some contacts may be formed of non-transparent conductor and other contacts formed of transparent conductor. For example, turning to FIG. 7, the base contact 54 may be in the form of a ring, having an open portion 58 through which an optical beam can pass. Accordingly, the base contact may be formed using an opaque conductor, such as copper, aluminum, or the like. In contrast, the steering contacts 56a, 56b, 56c may be formed using a transparent conductor. Although three steering contacts are illustrated here, other numbers of steering contacts such as four, five, or more can be used. The steering contacts may be designed to substantially cover a surface of the lens, with electrical separation between the contacts defined by small gaps 59 or the contacts may cover only a minor fraction of the surface, depending on the function of the lens. An additional contact centered along the optical axis of the lens can be included which provided primarily focal length change without affecting steering.

The amount of deformation of the lens will also be a function of the rigidity of the elastic material from which the lens is constructed. Less rigid materials will accordingly enable lenses which can be distorted with smaller forces, in turn translating into smaller voltages to obtain desired levels of steering or focusing. Accordingly, the elastically deformable lens may use a polymer, for example, having a Young's modulus of less than about 1 MPa. As a particular example, the lens may be formed from polydimethylsiloxane.

Figure 8:
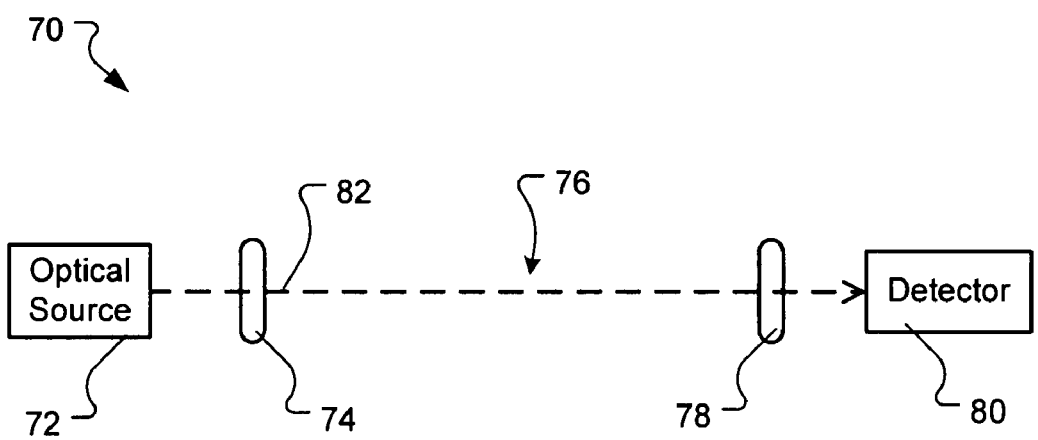
FIG. 8 is a block diagram illustration of an optical communications link in accordance with an embodiment of the present invention.

One exemplary application for deformable optical elements is within an optical communications link. For example, FIG. 8 illustrates an optical communications link 70 between an optical source 72 and a detector 80. An optical path 76 between the source and detector may include a free space link. Such an optical communications link may be, for example, a board-to-board link within an electronic system. An optical beam 82 can be steered and/or focused using a first deformable optical element 74 before passing through the optical path 76. A second deformable optical element 78 may be used for directing and/or focusing the optical beam onto the detector. Either the first or the second deformable optical element can be omitted if desired. The deformable optical elements can be used to dynamically adjust the steering, focus, or both to compensate for variations in the optical path during operation of the system.

For example, initial misalignment between the optical source 74 and the detector 80 may be corrected by beam steering. Distance tolerances in positioning of the source and detector may be corrected for by focal length changes. Relative position and distance of the source and detector may vary during operation, requiring ongoing adjustment of the beam steering and focal length. For example, closed loop feedback systems may be provided to control the optical elements.

As a particular example, beam steering at the source end can be controlled using optical energy reflected from a reflective target (not shown) at the detector end. For example, the second deformable optical element 78 or the detector 80 may be partially reflective, returning some of the energy of the optical beam 82 back toward the source 72. As another example, reflective elements may be placed just outside the second deformable optical element so that a properly aligned beam results in little or no reflected optical energy. Detectors (not shown) at the source can be used to control the beam steering in a closed loop feedback system.

Of course, deformable optical elements in accordance with embodiments of the present invention may potentially be used in other applications, including but not limited to, spatial light modulation, digital cameras, imaging systems, displays, photovoltaic systems, optical instruments, and the like.

Figure 9:
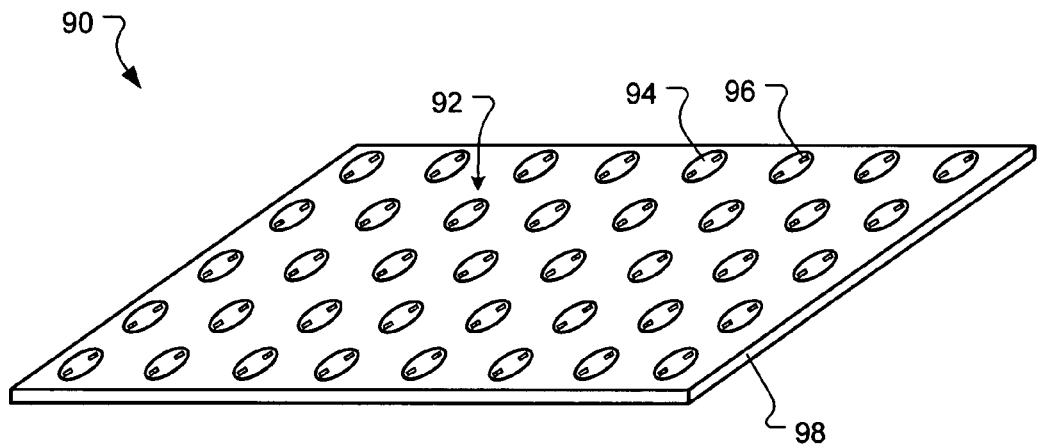
FIG. 9 is a perspective view illustration of an array of deformable optical elements in accordance with an embodiment of the present invention.

Arrays of elastically deformable optical elements can be formed as discussed further below. For example, FIG. 9 illustrates an array 90 of deformable optical elements 92. The elastically deformable optical elements include an elastically deformable lens 94 and electrical contacts 96. The elastically deformable optical elements can be supported by a substrate 98. Each elastically deformable lens can have at least one separate electrical contact, enabling individual control of the lenses via separately applied voltages. For example, an array can include electrically common base contact, such as a continuous electrical contact (e.g. a conductive substrate) or separate electrical contacts electrically-connected together. Separate steering or focus contacts can be provided on the side of the lenses opposite the electrically common base contact.

As another example, lenses within an array may have their contacts connected together in varying arrangements. Rows or columns of lenses may have one or more of their contacts connected together so that a single voltage applied to the commonly-connected contacts provides steering or focus control. Various arrangements of common connections can be used, including for example, where every lens within the array is individually controlled via a separate pair of contacts, where the entire array of lenses is controlled through a commonly-connected set of contacts, and arrangements in between these extremes.

Arrays of elastically deformable optical elements can be used, for example, in optical switching, optical computing, or similar applications. As an additional example, the array may be formed on top of an integrated circuit. Applications for arrays of elastically deformable optical elements may include individual pixel control in a charge coupled device and optical interconnect between integrated circuits.

Figure 10:
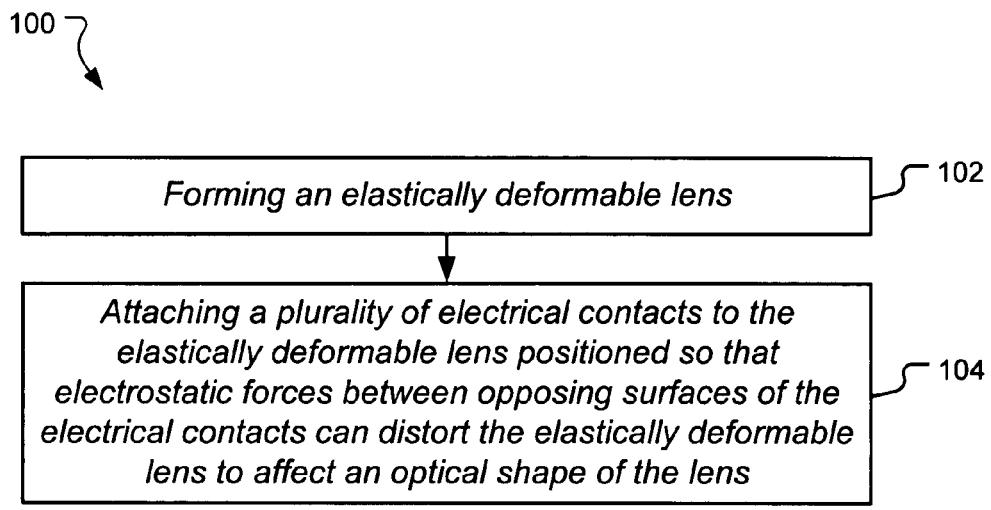
FIG. 10 is flow chart of a method of making a deformable optical element in accordance with an embodiment of the present invention.

Fabrication of a deformable optical element can be performed as shown in flow chart form in FIG. 10. A method 100 of making a deformable optical element can include forming 102 an elastically deformable lens and attaching 104 a plurality of electrical contacts to the elastically deformable lens. The electrical contacts can be positioned so that electrostatic forces between opposing surfaces of the electrical contacts can distort the elastically deformable lens as described above. As mentioned above, the shape of the lens and geometry of the electrical contacts can be designed so that predefined optical shapes (providing predefined optical properties) of the lens are obtained for specific voltages applied to the electrical contacts. For example, desired shapes may be determined using simulations, analysis, prototyping, or combinations thereof.

Various ways of forming the elastically deformable lens can be used. The elastically deformable lens may be formed by depositing and shaping a polymer material to define the elastically deformable lens. Deposition may be performed onto a substrate which is used only during manufacturing or is retained as part of the finished lens (or array of lenses). For example, a conductive substrate may be used as a base electrical contact. Alternately, the substrate may include electrical circuitry or interconnect wiring (e.g., an integrated circuit or printed circuit board).

Deposition of polymer material onto the substrate may be performed, for example, by printing, jetting, screening, spraying, plasma deposition, vapor deposition, spin casting, and similar processes. Various lithographic processes can be used to pattern the elastically deformable lens.

As another example, elastically deformable lenses can be formed by stamping or embossing an elastic material. Stamping or embossing may be performed at an elevated temperature.

Electrical contacts can be attached to the elastically deformable lens using a variety of techniques. For example, a first electrical contact can be deposited on the substrate, the elastically deformable lens formed on top of the first electrical contact, and the second electrical contact deposited on top of the elastically deformable lens. As another example, the electrical contacts can be deposited after the elastically deformable lens is formed. Electrical contacts may be formed by electroplating, vapor deposition, printing, jetting, screening, spraying, and similar processes. Lithographic processes can be used to pattern the electrical contacts.

In accordance with an alternate embodiment, electrical contacts can be attached to the elastically deformable lens by inserting or embedding the contacts into the lens.

Arrays of lenses can be formed simultaneously using the above described steps. If desired, an array of lenses can be separated into individual lenses. The individual lenses may be packaged for use or installation individually.

Summarizing and reiterating to some extent, a deformable optical element in accordance with embodiments of the present invention can be used to provide dynamic tuning of lens optical properties during operation of an optical system. For example, focal length changes and beam steering can be electronically controlled based on a voltage applied to electrical contacts directly attached to the lens. A deformable optical element can be useful in board-to-board and component-to-component optical interconnection within an electronic system. Other uses for a deformable optical element include optical communications links in general and other systems using optical beams. Because the lens properties are electronically controlled, a dynamically adjustable optical system may be implemented with less complexity and greater reliability than an equivalent capability mechanically adjusted system.

While the foregoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

The invention claimed is:

1. A deformable optical element comprising:
   an elastically deformable solid lens being passively deformable in response to an applied force;
   a plurality of electrical contacts directly attached to the elastically deformable lens and configured to receive an applied voltage; and
   the plurality of electrical contacts having opposing surfaces configured to develop an electrostatic force interacting between the opposing surfaces in response to the applied voltage, the plurality of electrical contacts applying the electrostatic force to elastically deform at least a portion of the elastically deformable lens between the electrical contacts and to which the electrical contacts are directly attached to create a predetermined optical effect.

2. The deformable optical element of claim 1, wherein the predetermined optical effect is a change in a focal length of the elastically deformable lens.

3. The deformable optical element of claim 1, wherein the predetermined optical effect is a change in a beam deflection angle of the elastically deformable lens.

4. The deformable optical element of claim 1, wherein the elastically deformable lens is formed from a polymer.

5. The deformable optical element of claim 4, wherein the polymer has a Young's modulus of less than about 1 MPa.

6. The deformable optical element of claim 4, wherein the elastically deformable lens is formed from polydimethylsiloxane.

7. The deformable optical element of claim 1, wherein at least one of the plurality of electrical contacts is formed of a transparent conductor.

8. The deformable optical element of claim 7, wherein the plurality of electrical contacts are formed of indium tin oxide.

9. The deformable optical element of claim 1, wherein the plurality of electrical contacts comprises:
   a base contact disposed on a first side of the elastically deformable lens; and
   a plurality of steering contacts disposed on a second side of the elastically deformable lens opposite the first side.

10. The deformable optical element of claim 1, comprising a plurality of elastically deformable lenses each having at least one separate electrical contact attached thereto.

11. The deformable optical element of claim 10, wherein each one of the plurality of elastically deformable lenses is individually controllable via the at least one separate electrical contact.

12. The deformable optical element of claim 10, wherein at least two of the plurality of elastically deformable lenses have corresponding electrical contacts electrically connected together to enable a single voltage to provide common control.

13. A method of controlling the optical shape of a deformable optical element comprising:
   providing an elastically deformable solid lens configured to be passively deformable in response to an applied force and having a plurality of electrical contacts directly attached to the elastically deformable lens;
   applying a voltage to the plurality of electrical contacts to generate an applied electrostatic force between the electrical contacts in proportion to the applied voltage; and
   distorting at least a portion of the elastically deformable lens between the electrical contacts and to which the electrical contacts are directly attached into a predetermined optical shape in response to the electrostatic force applied by the electrical contacts.

14. The method of claim 13, wherein the voltage controls at least one of a focal length of the lens and a beam deflection of the lens.

15. The method of claim 13, further comprising: propagating a light beam through the deformable optical element; and varying the voltage to steer the light beam to position the beam onto a detector.

16. The method of claim 15, wherein the voltage is controlled using a closed loop system.

17. A method of making a deformable optical element comprising:
   forming an elastically deformable solid lens configured to be passively deformable in response to an applied force; and
   attaching a plurality of electrical contacts to the elastically deformable lens positioned so that an applied electrostatic force generated between opposing surfaces of the electrical contacts can distort at least a portion of the elastically deformable lens between the electrical contacts and to which the electrical contacts are directly attached to affect an optical shape of the lens to form the deformable optical element.

18. The method of claim 17, wherein attaching the plurality of electrical contacts to the elastically deformable lens comprises:
   depositing a first electrical contact on a substrate, wherein the elastically deformable lens is formed on top of the first electrical contact; and
   depositing a second electrical contact on top of the elastically deformable lens.

19. The method of claim 17, wherein forming an elastically deformable lens comprises depositing and shaping a polymer material to define the elastically deformable lens.

20. The method of claim 17, wherein forming an elastically deformable lens comprises depositing a polymer material to define a plurality of elastically deformable lenses.

21. The method of claim 20, wherein attaching a plurality of electrical contacts to the elastically deformable lens comprises attaching at least two electrical contacts to each of the plurality of elastically deformable lenses to enable independent control of the plurality of elastically deformable lenses.

22. The method of claim 17, further comprising designing lens shape and electrical contact geometry so a predefined voltage applied to the electrical contacts produces a predefined optical shape of the lens.

23. The method of claim 20, further comprising separating the plurality of elastically deformable lenses into separate deformable optical elements.

* * * * *